United States Patent [19]

Cordes et al.

[11] 4,358,716
[45] Nov. 9, 1982

[54] ADJUSTABLE ELECTRICAL POWER CONTROL FOR GAS DISCHARGE LAMPS AND THE LIKE

[75] Inventors: Jack C. Cordes; Dennis J. Denen, both of Columbus, Ohio

[73] Assignee: White Castle System, Inc., Columbus, Ohio

[21] Appl. No.: 139,846

[22] Filed: Apr. 14, 1980

[51] Int. Cl.³ .................. G05F 1/00; H05B 37/02; H05B 39/04; H05B 41/36

[52] U.S. Cl. .................... 315/306; 315/DIG. 4; 315/DIG. 7; 315/194; 315/308; 307/265; 328/75

[58] Field of Search ............ 315/DIG. 4, DIG. 5, 315/DIG. 7, 308, 306, 194, 199, 311; 307/265, 269; 328/75

[56] References Cited

U.S. PATENT DOCUMENTS

| | | | |
|---|---|---|---|
| 3,927,349 | 12/1975 | Suhren et al. | 315/DIG. 4 |
| 3,967,159 | 6/1976 | Dendy et al. | 315/308 |
| 3,969,652 | 7/1976 | Herzog | 315/DIG. 7 |
| 4,016,451 | 4/1977 | Engel | 315/DIG. 4 |
| 4,087,702 | 5/1978 | Kirby et al. | 315/DIG. 4 |
| 4,156,166 | 5/1979 | Shapiro et al. | 315/306 |
| 4,163,923 | 8/1979 | Herbers et al. | 315/199 |
| 4,204,141 | 5/1980 | Nuver | 315/311 |
| 4,210,846 | 7/1980 | Capewell et al. | 315/DIG. 4 |
| 4,219,760 | 8/1980 | Ferro | 315/DIG. 4 |
| 4,241,295 | 12/1980 | Williams, Jr. | 315/199 |
| 4,251,752 | 2/1981 | Stolz | 315/DIG. 7 |
| 4,253,046 | 2/1981 | Gerhard et al. | 315/DIG. 7 |
| 4,286,195 | 8/1981 | Swinea, Jr. | 315/DIG. 4 |
| 4,287,468 | 9/1981 | Sherman | 315/DIG. 4 |

Primary Examiner—Saxfield Chatmon, Jr.
Attorney, Agent, or Firm—William Rambo

[57] ABSTRACT

The present solid state device generates variable interval, high frequency bursts of alternating current to dim or otherwise control a discharge lamp or the like, and features an adjustable duty-cycle burst control subcircuit that intermittently interrupts a pair of constant, phase-reversed, high frequency pulse sequences, thereby permitting variable interval bursts of the pulse sequences to reach a pair of semiconductor devices. The semiconductors alternately switch ON and OFF in response to the high frequency pulses applied thereto, thereby rapidly alternating the direction of current flow through a suitable inductor configuration which, in turn, is connected to the load.

9 Claims, 4 Drawing Figures

ADJUSTABLE ELECTRICAL POWER CONTROL FOR GAS DISCHARGE LAMPS AND THE LIKE

BACKGROUND OF THE INVENTION

The present invention generally relates to electrical dimmer and power control devices for discharge lamps and the like, and more particularly to those that deliver variable power in the form of high frequency, alternating current signals to a load.

Theoretically, electrical power may be varied by regulating any number of its basic parameters, but as a practical matter, some factors are more difficult to control than others owing to the characteristics of the electrical load. For example, a gas or electrical discharge lamp, such as the conventional fluorescent tube, poses a number of problems. The nonlinear conduction characteristic of the fluorescent tube makes voltage regulation, by itself, an impractical method of power control. The nonlinear conduction, or negative resistance, of the lamp requires a rather high voltage to turn the lamp on; once the arc is struck, however, the current must be limited or else the lamp might explode. Well known current limiting devices such as the conventional inductive ballast effectively maintain a constant operating level, but variable power controls that simply alter the current delivered to the fluorescent tube are effective only in a limited, medium brightness range. Too little current causes unwanted stroboscopic effects, shortened lamp life, and energy waste. Too much current, as previously indicated, may cause the lamp to explode.

Many devices vary the power delivered to a discharge lamp by altering the product of voltage times current. This mode of operation yields all of the liabilities of voltage or current regulation, although with some degree of improvement as a function of component design. Basically, the lamp is forced to operate at currents above or below an optimum value for creating a stable plasma discharge; furthermore, allowing voltage to change yields erratic firing.

Phase control allows alternating current to be applied to the lamp load only during specified parts of the a.c. waveform. A wide range of phase angles can be obtained, but the lower angles tend to cause flicker and inefficiency in fluorescent systems. Phase control devices also tend to be relatively expensive owing to the design of the inductors they employ.

High frequency drive systems for fluorescent lamps have existed for many years and beneficial side effects such as increased illumination efficiency have been frequently reported. Chopper systems, for example, are a class of high frequency regulators that sense an impending overcurrent event and shut themselves off until the current to the load drops below a critical value. Some choppers regulate current with a form of feedback-controlled, pulse width modulation. In another mode of regulation, the width of the pulses is more or less fixed, but the frequency of repetition varies. By changing the repetition rate, the power delivered to the load varies.

Power may also be regulated by changing the time factor rather than the current or voltage of the signal sent to the lamp load. The present burst control system utilizes this principle as well as the optimizing effects of high frequency signals. A value of voltage is selected which results in reliable firing of the discharge lamp or similar device; a value of current is chosen which provides a stable discharge; and a high frequency value is selected which increases the efficiency of the load's performance. Without more, these fixed parameters would theoretically result in constant power output. But if these fixed factors are applied intermittently for variable intervals of time, then the total power supplied to the load will change. Thus the present invention regulates its power output by providing high frequency, alternating current to the load for variable intermittent intervals, known as bursts.

The most relevant prior art known to the applicants are represented by U.S. Pat. Nos. 3,657,598 issued Apr. 18, 1972 to Nomura et al.; 3,927,349 issued Dec. 16, 1975 to Suhren et al.; and 4,087,722 issued May 2, 1978 to Hancock.

U.S. Pat. No. 3,657,598 issued to Nomura et al. discloses a control circuit which imparts time intervals longer than the turn-off time of its semiconductor switches to a pair of pulse sequences which drive the switches to conduction. While this time interval is functionally analogous to the dwell time provided by one form of the present invention, the Nomura control circuit is structurally quite dissimilar to the signal control means herein disclosed. Other components of the present power control apparatus bear little or no resemblance to the Nomura device.

U.S. Pat. No. 3,927,349 issued to Suhren et al. discloses a lamp dimmer which generates a pair of low frequency, variable pulse width synchronization signals and a relatively high frequency, zero-crossing control signal. The present adjustable power control develops pulse sequences somewhat analogous to Suhren's control and synchronization signals, but the present invention isolates a single, variable low frequency pulse sequence within a burst control device which, in turn, intermittently interrupts two high frequency phase-reversed pulse sequences for variable intervals before those high frequency signals reach first and second switches. In the Suhren device, however, two variable low frequency synchronization signals and a single high frequency control signal combine to form a final pair of pulses via two sets of NAND gates and pulse transformers. Also, the critical components of the two devices are structurally quite different.

U.S. Pat. No. 4,087,722 issued to Hancock discloses a lamp operating transformer and a flasher control that bear some resemblance to a preferred form of inductor configuration and the burst control device employed in the present adjustable power control; however, a number of dissimilarities are also readily apparent. First, the Hancock device dims the lamp load by varying the width of the individual pulses applied thereto. The present device, in contrast, generates pulses of fixed width and frequency and controls the power applied to the fluorescent load by varying the time interval between groups or bursts of these constant pulses. Secondly, in the lamp operating transformer of the Hancock device, the opposite ends of the primary winding apparently alternately receive the pulses of power, and the primary center tap is normally grounded. In contrast, the opposite ends of the transformer primary preferably employed in the present device alternately conduct a direct current signal received at the primary center tap to a pair of semiconductor switches. Third, the Hancock flasher control is intended to extinguish the lamp arc for variable intervals of time and appears to do so by grounding the switching devices so that no pulses reach the transformer primary. In contrast, our invention does not visibly extinguish the lamp arc; it intermittently interrupts portions of first and second pulse sequences for very short intervals of time, thereby allowing variable bursts of high frequency pulses to reach their respective switches. The Hancock device differs in structure and function from the present adjustable power control apparatus in other respects as well.

SUMMARY AND OBJECTS OF THE INVENTION

The present adjustable electrical power control apparatus provides variable power to a load from first and second, direct current (d.c.) inputs and comprises in combination: signal control means, first and second semiconductor switching devices, burst control means, and load-matching inductive means.

The signal control means are electrically connected to the first d.c. input and include a high frequency pulse generator and a logic network. The signal control generates first and second pulse sequences having a fixed frequency within the range of 5,000 to 250,000 pulses per second and a fixed duty-cycle ratio. The pulses of the second sequence are symmetrical to and reversed in phase with the pulses of the first sequence.

The first and second switches are electrically connected to the signal control means and alternately switch ON and OFF in synchronization with portions of the first and second pulse sequences respectively applied to the switches.

The burst control means are electrically connected to the first d.c. input and to the signal control means and include an adjustable duty-cycle pulse generator and a third semiconductor switching device. The burst control simultaneously and intermittently interrupts the first and second pulse sequences, thereby permitting intermittent, variable interval bursts of these pulse sequences to reach their respective switching devices.

The load-matching inductive means are electrically connected to the first and second switching devices, the second d.c. input and the load. The inductive means provide an alternating path of conduction for the current provided by the second d.c. input in response to the alternating, high frequency ON and OFF states of the first and second switching devices, and thereby provides intermittent, variable interval, high frequency bursts of alternating current to the load.

One object of the present invention is to provide an efficient, relatively inexpensive, and relatively simple apparatus for varying the power delivered to a discharge lamp, an inductive or microwave heating unit, an electrical discharge machining or welding tool, or the like.

Another object of the present invention is to provide an adjustable power control apparatus that substantially conserves energy.

A further object of the present invention is to provide an adjustable power control apparatus that effectively matches the optimum voltage, current and frequency characteristics of the load and that fixes these values, varying only the time intervals during which they are intermittently applied to the load.

Still another object of the present invention is to provide an effective and efficient dimmer control for a discharge lamp that dispenses with the conventional inductive ballast and which permits the light output of the lamp to be varied over a wide range of illumination without flicker or other adverse stroboscopic effects.

DESCRIPTION OF THE PREFERRED EMBODIMENT

Figure 1:
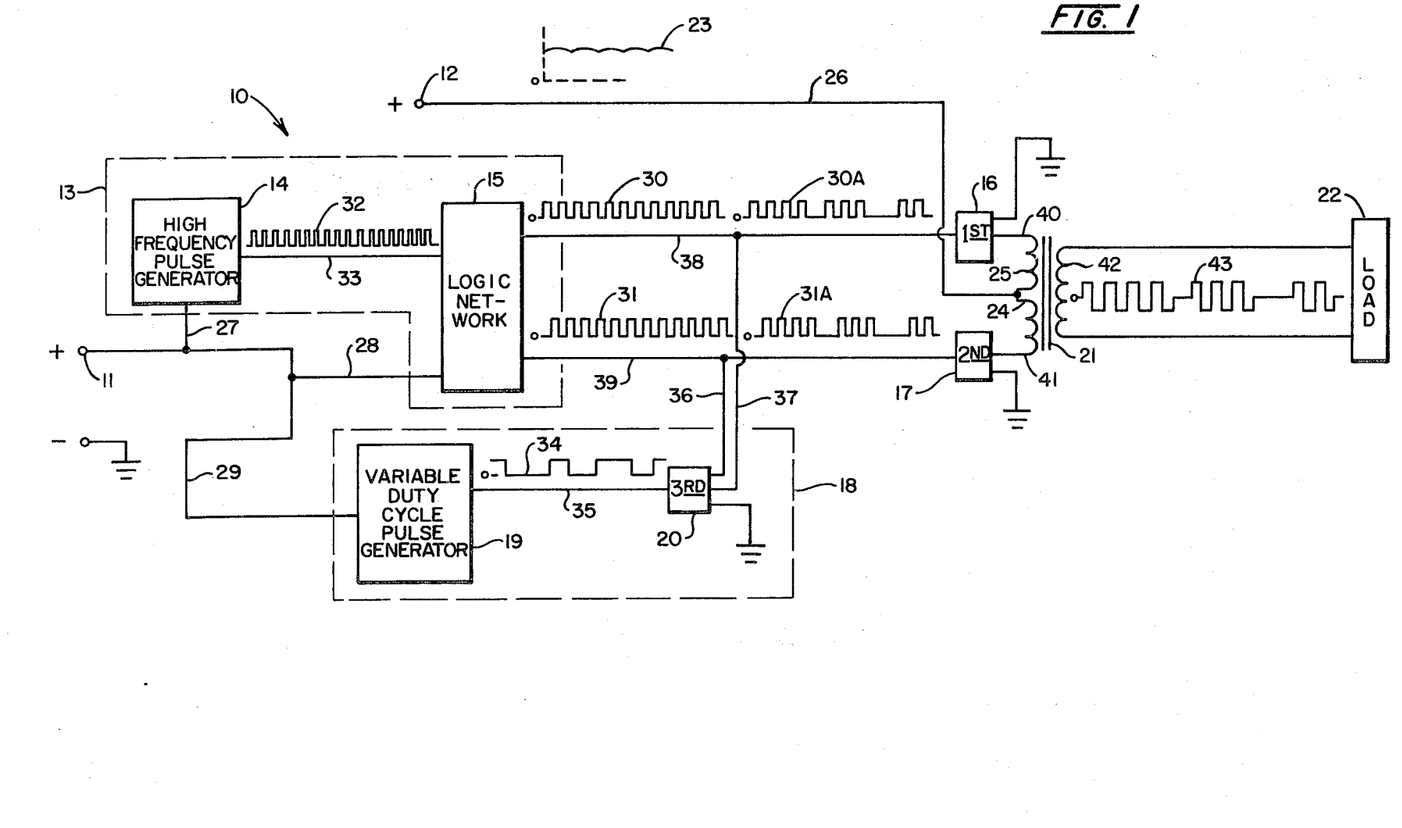
FIG. 1 is a block diagram illustrating the basic, generic form of the present adjustable power control apparatus and includes representations of various waveforms generated by the components therein.

FIG. 1 illustrates the present invention in its generic form. As indicated, the adjustable power control apparatus, generally designated 10, broadly comprises first and second direct current (d.c.) inputs 11 and 12, respectively; signal control means 13 having a high frequency pulse generator 14 and a logic network 15; first and second semiconductor switching devices 16 and 17, respectively; burst control means 18 having an adjustable duty-cycle pulse generator 19 and a third semiconductor switching device 20; and suitable load matching inductive means 21. With its components electrically interconnected, the present apparatus controls the amount of power provided to a load 22. The load 22 may be any of a number of electronic appliances, such as a discharge lamp, an inductive or microwave heating unit, or an electrical discharge machining or welding tool.

The second d.c. input 12 provides a power signal, represented by a slightly rippled waveform 23, to any suitable load matching configuration 21 which in turn provides an alternating path of conduction for the second d.c. input and hence, an alternating output to the load 22, in response to the high frequency alternation of the first and second switching devices 16 and 17 between ON and OFF states. The power signal, for instance, may be transmitted to a center tap 24 located on a transformer primary winding 25 via an electrical conductor 26. The first electrical input 11 provides a service signal substantially similar to the power signal 23, although preferably reduced in voltage, to the high frequency pulse generator 14 via a conductor 27, to the logic network 15 via a conductor 28, and to the variable duty cycle pulse generator 19 via a conductor 29.

The major subcircuits of the present invention include the signal control means 13 and the burst control means 18, both of which generate pulse sequences. The pulse sequence outputs of the signal control means, via the first and second switches 16 and 17, determine the direction of current flow of the power signal 23 through the load transformer 21; and the burst control means 18, in response to an internal pulse sequence, intermittently interrupts the signal control outputs at variable time intervals, thereby altering those outputs to form high frequency bursts of pulses which reach the first and second switches.

The outputs of the signal control means 13 are first and second, substantially square wave, high frequency pulse sequences represented by the waveforms 30 and 31, respectively. These signal control outputs 30 and 31 have substantially constant and identical duty cycle ratios. In other words, given an interval of time in which the presence of an individual pulse represents a logic HI state and the absence of an individual pulse represents a logic LO state, the ratio of time spent logic HI to time spent logic LO is fixed and identical for both outputs. Furthermore, the width of the individual pulses of the pulse sequences 30 and 31 are fixed and identical, and the frequencies of alternation of the pulse sequences between these HI and LO states are fixed, identical, and, preferably, within the range of 5,000 to 250,000 times per second. Finally, the second pulse sequence 31 is reversed in phase with the first pulse sequence. In other words, at a given point in time, only one of the two sequences is logic HI.

The signal control outputs 30 and 31 are generated in the following manner. The high frequency pulse generator 14 receives a direct current service signal from the first electrical input 11 via a conductor 27. The pulse generator 14 comprises a free-running oscillator, multivibrator or other device well known to those skilled in the art for generating a fixed pulse train output, represented by a clocking waveform 32, having a frequency preferably in the range of 10,000 to 500,000 pulses per second. The high frequency pulse generator output 32 is provided to the logic network 15 via a conductor 33, and the logic network is also connected to the first electrical input 11 via the conductor 28. The logic network 15 comprises a flip-flop, Schmitt trigger, decade counter, or other components well known to those skilled in the art for generating the first and second pulse sequences 30 and 31 previously described.

One of the significant features of the signal control means 13, besides its obvious simplicity, is its adaptability to various uses and levels of electrical input. One purpose of the overall invention is to provide variable power in the form of intermittent, variable-interval high frequency alternating current having fixed voltage, current, and frequency characteristics matched to the load. However, different loads operate most effectively in different ranges of voltage, frequency, current, and the like. A gas discharge lamp, for instance, differs in optimum frequency, current and other parameters from an electrical discharge welding tool. Indeed, the efficiency of some loads, such as induction heaters is enhanced if the frequency can be changed to compensate for the incidental effects of certain operational variables, such as the magnetic effects of temperature changes. By changing the size or capacity, but not the types or arrangement, of the components within the signal control means 13, one may suit the present invention to the load requirements. The burst control means 18 is similarly adaptable, but the burst control 18 and the signal control 13 differ in pulse generating capability and, most importantly, in variability. The signal control, once its components are selected, provides an output having constant pulse characteristics that are not ordinarily changed outside of exceptional circumstances; the burst control, on the other hand, has at least one component which is routinely adjusted while the present invention is actually in use. The general purpose, then, of the burst control means 18 is to provide the entire system with the capacity to adjust over a wide range the power delivered to any of the above-identified electrical units that make up the load 22.

The burst control means 18 does not generate an external signal as such; instead, the variable duty cycle pulse generator 19 generates a pulse sequence internal to the subcircuit. This internal signal, represented by the variable duty cycle waveform 34, is a substantially rectangular wave, direct current pulse sequence like the signal control outputs 30 and 31. Unlike the signal control outputs, however, it has logic HI and logic LO states which do not necessarily remain constant in time. Thus, the width of the individual pulses of the variable duty-cycle sequence 34 may be changed. Also, the variable sequence 34 has a relatively low frequency, preferably within the range of 40 to 10,000 pulses per second.

The variable duty-cycle pulse sequence 34 is generated in the following manner. The variable pulse generator 19 receives the direct current service signal from the first electrical input 11 via the conductor 29. This pulse generator 19 preferably comprises a simple oscillator or multivibrator and an adjustable, resistance-capacitance network in series with charging and discharging diodes, although other analogous networks known to those skilled in the art would suffice. By adjusting the amount of resistance in series with the charge and discharge diodes in reciprocal fashion, the time constant to charge or to discharge the capacitor can be favored and the period of oscillation for the pulse generator 19 may be varied. Practically any means of varying the resistance may be employed with the present device, such as a mechanically variable resistor having a movable wiper arm or a simple electronic subcircuit providing variable resistance in response to changes in ambient light or other external factors.

The third semiconductor switching device 20 receives the variable duty cycle pulse generator output 34 via a conductor 35 and switches ON and OFF in response to the alternations in logic HI and logic LO states of the variable pulse sequence 34. In its ON state, the third switching device 20 simultaneously interrupts or diverts the first and second pulse sequences 30 and 31 via the conductors 36 and 37 before they reach the first and second switching devices 16 and 17. As can be seen in FIG. 1, the burst control conductors 37 and 36 are connected, respectively, to the conductors 38 and 39 lying between the signal control means and the first and second semiconductor switches 16 and 17. In effect, the burst control means 18 leaves intermittent gaps of variable time intervals in the first and second pulse sequences 30 and 31 during which these pulse sequences remain in a logic LO state, as represented in the altered, first and second pulse sequence waveforms 30A and 31A.

The phase-reversed characteristics of the first and second pulse sequences 30 and 31 remain unchanged. Thus, at any given point in time, either the altered pulse sequences 30A and 31A are both logic LO, or else only one of the altered pulse sequences is logic HI.

The first and second semiconductor switching devices 16 and 17 are electrically connected via conductors 38 and 39, respectively, to the first and second pulse sequence outputs, respectively, of the signal control means, as altered by the burst control means. The semiconductors 16 and 17 receive the altered pulse sequences 30A and 31A, respectively, at their control terminals and alternately switch ON and OFF in response to the logic HI and logic LO states of their respective pulse sequence inputs. In effect, the switches receive bursts of high frequency pulses for variable time intervals determined by the operation of the adjustable duty cycle pulse generator 19 via the third switching device 20. The semiconductor devices 16 and 17 may be NPN transistors, field-effect transistors, thyristors or derivatives thereof, and have power delivering and power source terminals electrically connected to the load matching means 21 and to a circuit common point designated as "ground" in FIG. 1.

As previously indicated, the load matching inductive means 21 preferably comprises a transformer having a primary winding 25 and a primary center tap 24. The first and second switching devices 16 and 17 may be electrically connected to the opposite ends 40 and 41, respectively, of the transformer primary winding 25. In their ON states, the switches alternately conduct the power signal 23, received at the transformer center tap 24, in opposite directions through the transformer primary 25. Thus the current through the transformer primary 25 alternately flows in opposite directions as the first and second switches 16 and 17 are alternately turned ON by the first and second altered pulse sequences 30A and 31A. During the time interval when both pulse sequences are logic LO as a result of the burst control function, both the first and second switches 16 and 17 are OFF and the power signal does not travel through the transformer primary winding 25.

As is well known in the art, magnetic flux cannot be generated if there is no electron flow in the transformer; thus, no current is established in the transformer secondary winding 42 when both the first and second switches are OFF. When the switches are alternately conducting, however, and the power signal is therefore flowing in alternating directions through the transformer primary winding, an alternating current is established in the transformer secondary 42. The output of the secondary, then, provides intermittent bursts of high frequency alternating current 43 to the load 22. The voltage, current, and frequency of the bursts of alternating current 43 are ordinarily fixed according to the needs of a given load. On the other hand, the time intervals during which there are no bursts of high frequency alternating current are variable and are directly related to the operation of the burst control means 18. Thus, since the time periods during which the bursts are applied to the load are variable, the total amount of power delivered over a given period of time is variable. Accordingly, the load 22, such as a discharge lamp, an inductive or microwave heating unit, an electrical discharge machining or welding tool and the like, operates efficiently even though the amount of electrical power on which it operates may be changed.

Figure 2:
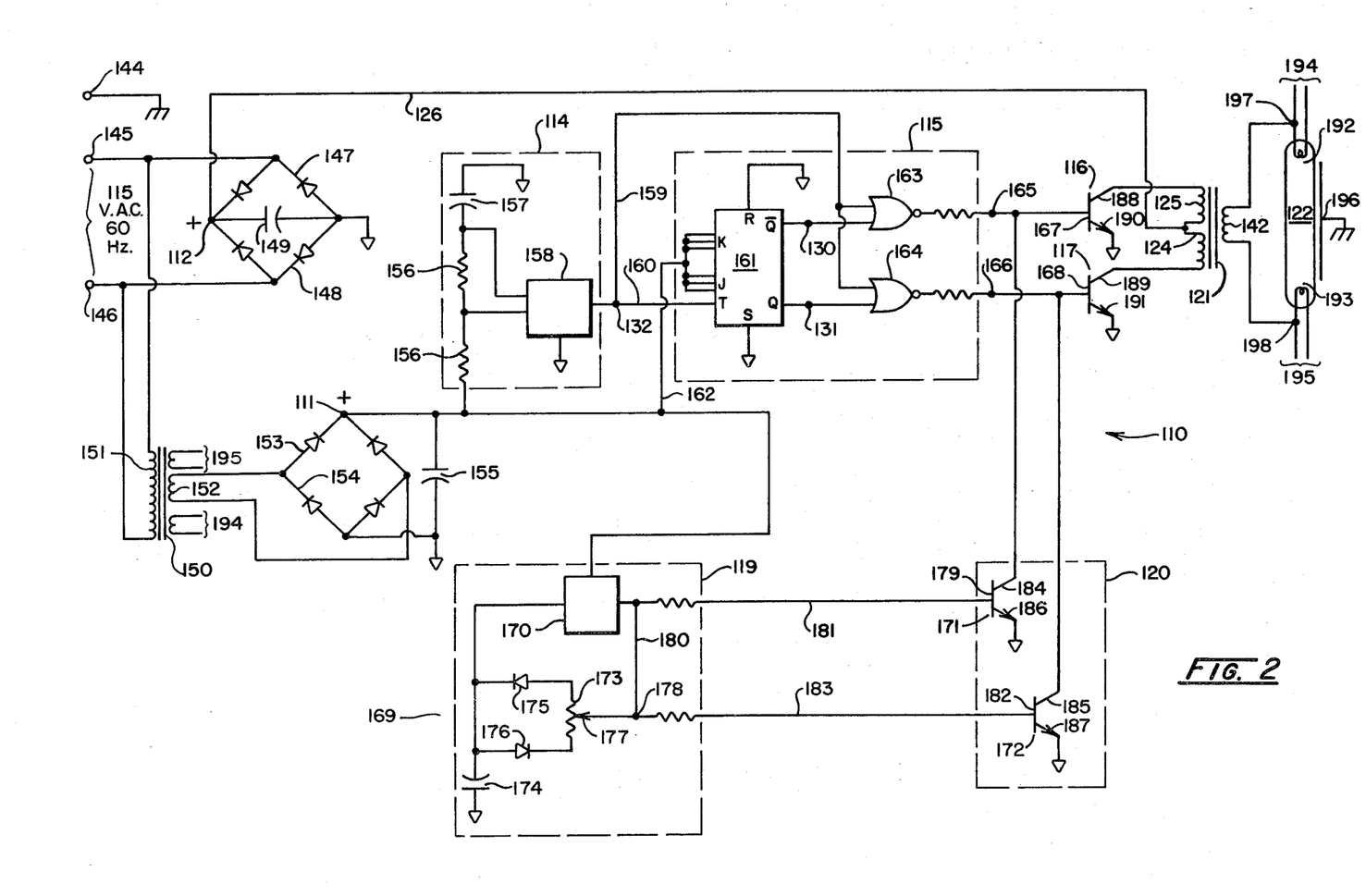
FIG. 2 is a circuit diagram of a specific embodiment of the present invention used as a dimmer control for a discharge lamp.

FIG. 2 illustrates a particular species of the adjustable power control apparatus, generally designated 110, as employed to illuminate and dim a gas or electric discharge lamp 122.

The system initially derives its electrical power from a commercial, alternating current (a.c.) outlet represented by three terminals 144, 145, and 146. Preferably, the hot terminals 145 and 146 provide conventional a.c. current in the 110-120 volt, 60H$_3$ range, although the power control apparatus may be adapted to use other voltage and frequency levels. The grounded terminal 144 provides the present apparatus with a fixture safety ground to prevent shock hazard.

Second rectifying and filtering means 147 electrically connected across the a.c. source terminals 145 and 146 develop a direct current power signal at node 112. These rectifying and filtering means 147 have been designated as second for the sake of uniformity, because they are analogous to the second d.c. input 12 illustrated in FIG. 1. Preferably, the second rectifying and filtering means 147 comprises a diode bridge 148 which provides full wave rectification and a filter capacitor 149 which smooths the rectified current, leaving only a slight ripple in the d.c. power signal output. The output node 112 of the second rectifying and filtering means 147 is electrically connected, via a conductor 126, to a center tap on the primary winding 125 of a load transformer 121. As will be readily recognized, the load transformer 121 and the conductor 126 are preferred forms of the load-matching inductive means 21 and the conductor 26 depicted in FIG. 1.

In addition to the second rectifying and filtering means 147, voltage reduction means 150 are electrically connected across the hot a.c. input terminals 145 and 146. The voltage reduction means 150 preferably comprise a step-down transformer having a primary winding 151 and at least one secondary winding 152, and preferably provides a substantially reduced a.c. output (e.g. 5 v) to other parts of the system.

Connected across the secondary winding 152 of the step-down transformer is a first rectifying and filtering subcircuit 153 which develops a direct current service signal at node 111, analogous to the first d.c. input 11 illustrated in FIG. 1. Preferably, the first rectifying and filtering means 153 comprises a diode bridge 154 which provides full wave rectification and a capacitor 155 which is connected across the output nodes of the diode bridge 154 and which smooths the rectified current, leaving only a slight ripple in the d.c. service signal. The output node 111 of the first rectifying and filtering subcircuit 153 provides input current to a free-running, high frequency oscillator subcircuit 114, a flip-flop/NOR gate subcircuit 115, and a variable duty cycle, low frequency oscillator subcircuit 119.

The high frequency oscillator network 114 is a preferred form of the high frequency pulse generator 14 illustrated in FIG. 1 and comprises resistance elements 156, a capacitor 157, and an integrated circuit (I.C.) timer or clocking device 158. The resistors 156 and the capacitor 157 are connected in series to the output of the first rectifying and filtering subcircuit 153 and together establish an RC time constant for the clocking device 158. The timer I.C., in turn, generates a free-running, high frequency clock output at node 132, preferably in the range of 10,000 to 500,000 pulses per second. The node 132 clock output is analogous to the high frequency pulse train 32 in FIG. 1 and is illustrated in FIG. 3.

The flip-flop/NOR gate subcircuit 115 receives the high frequency clock output 132 via a pair of conductors 159 and 160, and is a preferred form of the logic network 15 in FIG. 1. The flip-flop device 161, preferably a type-7470JK flip-flop, receives the service signal from the first rectifying and filtering means 153 via a conductor 162 and the node-132 clock output via the conductor 160. The flip-flop 161 produces first and second intermediate pulse sequences at nodes 130 and 131, respectively. The frequency of these intermediate, node-130 and node-131 pulse sequences is approximately one-half the frequency of the node-132 clock output, and the two intermediate sequences are reversed in phase with each other. In essence the node-130 and node-131 sequences are analogous to the first and second pulse sequences 30 and 31 in FIG. 1, and are illustrated in FIG. 3. Preferably, however, first and second NOR gates 163 and 164, respectively, substantially change the intermediate outputs of the flip-flop device 161 to provide dwell time in the final pulse sequence outputs of the overall flip-flop/NOR gate subcircuit 115.

Figure 3:
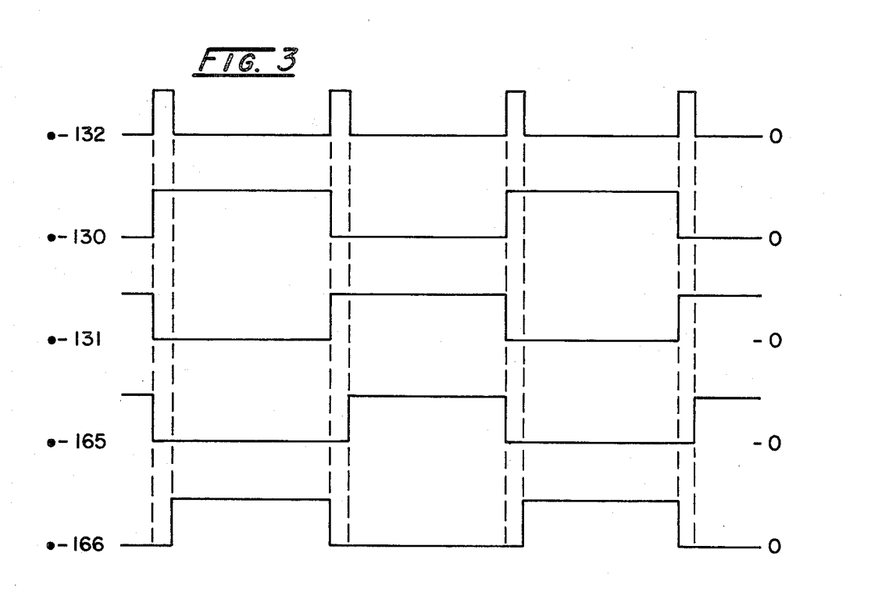
FIG. 3 is a diagram illustrating the relationship between certain waveforms generated by the power control apparatus.

The operation of the NOR gates 163 and 164 may be more easily understood by referring to FIG. 3 as well as FIG. 2. The first NOR gate 163 receives the node-132 clock output and the node-130 intermediate pulse sequence. As understood by those skilled in the art, the output of the first NOR gate will be logic HI only when both the node-132 clock output and the node-130 pulse sequence are logic LO. The period of time for any given logic HI interval of the first NOR gate 163 output, identified by node 165, is therefore equal to the difference between any logic HI interval of the node-130 sequence and any logic HI interval of the node 132 clock output. The second NOR gate 164 functions in an identical manner, except that it receives the node 131 intermediate pulse sequence and the clock output 132. Thus the second NOR output, identified in FIGS. 2 and 3 at node 166, is quite similar to, but reversed in phase with, the first NOR gate node 165 output.

The purpose for shortening the logic HI time intervals of the first and second node 130 and node 131 intermediate outputs is to provide dwell time between the phase reversed, node 165 and node 166 NOR gate outputs for alternately firing first and second, high voltage NPN transistors 116 and 117, respectively. The first and second transistors 116 and 117 are analogous to the first and second semiconductor switching devices 16 and 17 illustrated in FIG. 1, and receive bursts of the node 165 and node 166 NOR gate outputs at their respective base electrodes 167 and 168. As is well known in the art, the transistors 116 and 117 switch ON and OFF when logic HI and logic LO pulse sequences are respectively applied. But the ON state of an NPN transistor is preceded by a partially conductive rising state and followed by a partially conductive falling state. Thus, if there were no time gap or dwell time between the phase-reversed HI states of the node 165 and node 166 NOR gate outputs, there would probably be instants when both transistors would be simultaneously ON. In other words, the first transistor 116 might be partially conductive during its falling state at the same time as the second transistor 117 is partially conductive during its rising state. By averting this possibility, the first and second NOR gates 163 and 164 prevent self-heating, efficiency loss, and possible damage to the system.

Before the node 165 and node 166 NOR gate outputs reach the first and second transistors 116 and 117, however, they may be interrupted for variable intervals of time by the burst control means which include an adjustable duty-cycle pulse generator 119 and a third switching device 120. In this preferred form of the invention, the pulse generator 119 comprises an adjustable resistance-capacitance-diode network 169 and a second timer integrated circuit (I.C.) 170, quite similar to the first timer I.C. 158 employed in the high frequency pulse generator 114. The third switching device 120, in turn, comprises third and fourth transistors 171 and 172, respectively, which are preferably of the low voltage, NPN type.

The adjustable pulse generator 119 is a simple duty cycle oscillator and operates in a manner similar to the pulse generator 19 illustrated in FIG. 1. The product of an adjustable resistor 173 and a capacitor 174 determines the period, or RC time constant, of the oscillator. The second timer I.C. 170 produces a logic output which is alternately HI and LO. When the I.C. output is logic HI, the capacitor 174 charges via a first diode 175; when the I.C. output is logic LO, the capacitor 174 discharges via a second diode 176. Since the wiper 177 can adjust the value of the resistor 173 in reciprocal fashion, the time constant to charge or to discharge the capacitor 174 can be favored. The adjustable resistor 173 and its wiper arm 177 may be varied by mechanical or electronic means. It is quite possible, however, to replace the adjustable resistor 173 with other adjustable resistance means, such as a light sensing device which might provide a variable resistance value in series with the charge and discharge diodes 175 and 176 as the ambient light level changes. The output of the variable pulse generator 119 at node 178 in FIG. 2 is illustrated at node 178 in FIG. 4. As indicated by the time intervals A and B in FIG. 4, the pulse width or logic HI states of the node 178 output, may be altered substantially. Preferably, the average frequency of the node 178 output is within the range of 40 to 10,000 pulses per second. It will be understood, however, that unless the resistance 172 is altered either manually or electronically, the duty cycle of this relatively low frequency node 178 pulse sequence will remain constant.

The third and fourth transistors 171 and 172 receive identical signals since the node 178 pulse sequence is provided to the base 179 of the third transistor 171 via the conductors 180 and 181 and to the base 182 of the fourth transistor 172 via the conductor 183. The collector electrodes 184 and 185 of the two transistors are electrically connected close to the node 165 and node 166 NOR gate outputs, respectively. Since the node 178 variable pulse sequence is received at both of the transistor base electrodes 179 and 182, the third and fourth transistors switch ON and OFF simultaneously. In their ON states, the third and fourth transistors are rendered conductive, and the node 165 and node 166 NOR gate outputs are diverted or interrupted via the emitter electrodes 186 and 187, respectively, which are connected to a circuit common point. When the node 178 pulse generator output is logic LO, the third and fourth transistors are nonconductive and the high frequency node 165 and node 166 NOR gate outputs reach the base electrodes 167 and 168 of the first and second transistors 116 and 117, respectively. Thus, the third and fourth transistors 171 and 172 provide intermittent interruptions in the NOR gate outputs only at intervals determined by the variable pulse generator 119. In effect, the first and second transistors 116 and 117 receive intermittent bursts of the first and second NOR gate outputs, the time intervals of said bursts being controlled by the setting of the adjustable pulse generator resistor 173.

The first and second transistors 116 and 117 are electrically connected via their collector electrodes 188 and 189, respectively, to the opposite ends of the transformer primary winding 125, and to a circuit common point via their emitter electrodes 190 and 191, respectively. The first and second transistors 116 and 117 and the load transformer 121 operate quite like the first and second switching devices 16 and 17 and the load transformer 21 in FIG. 1. Preferably, the gas discharge lamp 122 illustrated in FIG. 2 is provided with first and second heater filaments 192 and 193 at opposite ends thereof, although, lamp loads employing simple electrodes rather than heater filaments may also be employed. Electrical conductors 194 and 195, portions of which have been omitted from FIG. 2 for clarity, provide low voltage, a.c. current from the voltage reduction means 150. In this manner, the conductors 194 and 195 also serve as small, isolated secondary windings at opposite ends of the main secondary 152 of the stepdown transformer. A metal reflector body 196, which may be part of the lamp fixture (not shown) into which the discharge lamp 122 is inserted, is preferably connected to the safety ground terminal 144. An electrical field which exists between the reflector body 196 and the lamp 122 aids in ignition.

Figure 4:
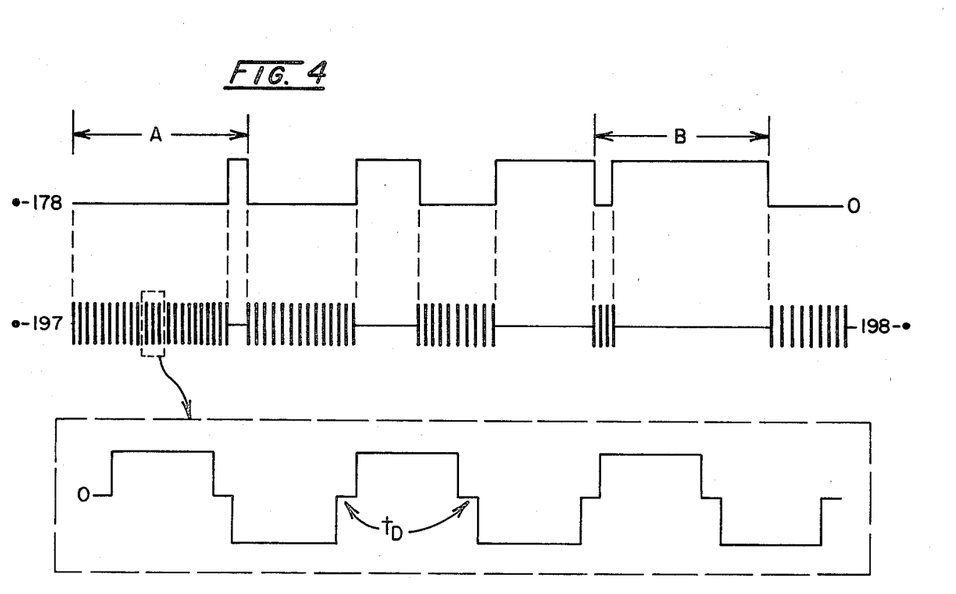
FIG. 4 is a diagram illustrating the relationship between the variable pulse sequence of the burst control means and the final output of the present adjustable power control.

The alternating output from the load transformer secondary 142 to the gas discharge lamp 122 is represented in FIG. 4 by the intermittent, high frequency, a.c. bursts that appear across the nodes 197 and 198 in FIGS. 3 and 4. Three, substantially rectangular wave, alternating current waveforms within one of the high frequency bursts are magnified for clarity below the illustration of the nodes 197 and 198 output in FIG. 4. It will be noted that dwell time $t_D$, established by the first and second NOR gates 163 and 164 has become part of the transformer secondary output. Furthermore, by comparing the node 178 variable pulse sequence output with the nodes 197 and 198 output, one may note that the individual, high-frequency bursts of the secondary output correspond to the logic LO states of the node 178 variable pulse generator output.

Thus the lamp load 122 receives, for variable time intervals determined by the adjustable duty cycle pulse generator 119, intermittent bursts of power made up of high frequency a.c. waves having constant voltage, current, frequency, and amplitude values. When the variable pulse generator 119 is set so that the node 178 output ratio of time spent logic HI to time spent logic LO is small, as indicated by the time interval A in FIG. 4, relatively long bursts of the transformer secondary power reach the lamp 122, and the amount of illumination emitted by the lamp is relatively high. When the ratio of time spent logic HI to time spent logic LO is large, as indicated by the time interval B, relatively short bursts of the transformer secondary output reach the lamp, and the amount of illumination is relatively low.

The range of illumination levels provided by the present adjustable power control apparatus is quite broad as compared with other electronic dimmers for discharge lamps. And since all of the parameters of the secondary output generated across the nodes 197 and 198 are constant except for the time intervals of the intermittent bursts, the present invention does not cause flicker, raccoon-tailing, poor efficiency, reduced lamp life, or other problems associated with the manipulation of voltage, current, or phase angle in other dimmer circuits. On the whole, the present adjustable electronic apparatus, as adapted to control electrical power delivered to a gas discharge lamp, provides a relatively simple and effective energy conservation device.

While a single, specific embodiment of the adjustable power control apparatus has been disclosed in detail, the description above is not intended to unduly limit the present invention nor restrict the scope of the following claims.

We claim:

1. Adjustable electrical power control apparatus for supplying variable power to a load comprising:
   (a) first direct current input means;
   (b) second direct current input means;
   (c) signal control means electrically connected to the first direct current input means and including high frequency pulse generating means for producing high frequency pulses within the range of 5,000 to 250,000 pulses per second;
   (d) burst control means electrically connected to said first direct current input means and to said signal control means and including an adjustable pulse generator for producing variable duty cycle pulses, said burst control means being operable to intermittently interrupt the high frequency pulses produced by said high frequency pulse generating means;
   (e) semiconductor switch means electrically connected to receive the intermittently interrupted high frequency pulses produced by said signal control means and said burst control means, said semiconductor switch means being conductive in response to each pulse received and nonconductive between pulses; and
   (f) load-matching inductive means electrically connected to receive current from said second direct current input means and responsive to said semiconductor switch means for providing an alternating path of conduction for current from said second direct current input means to a load.

2. Apparatus according to claim 1, wherein said load comprises a gas discharge lamp.

3. Apparatus according to claim 1, wherein said first direct current input means comprises voltage reduction means electrically connected across a source of alternating current and first rectifying and filtering means connected across the voltage reduction means.

4. Apparatus according to claim 1, wherein said signal control means comprises a free-running, high frequency oscillator network electrically connected to said first direct current input means and generating a high frequency clocking signal; a flip-flop device receiving the clocking signal and generating first and second intermediate pulse sequences; first and second NOR gates respectively receiving said first and second intermediate pulse sequences and said clocking signal and thereby generating first and second NOR gate outputs which are logic HI only when their respective inputs from said oscillating network and said flip-flop device are logic LO.

5. Apparatus according to claim 3, wherein said load comprises a gas discharge lamp having heater filaments at opposite ends thereof electrically connected to said voltage reduction means.

6. Apparatus according to claim 3, wherein said second direct current input means is provided by second rectifying and filtering means electrically connected across said source of alternating current.

7. Apparatus according to claim 4, wherein said semiconductor switch means includes first and second high voltage transistors each having base, collector and emitter electrodes, the base electrodes of said transistors being connected to receive said first and second NOR gate outputs, respectively, the collector electrodes of said transistors being electrically connected to the opposite ends of said load-matching inductive means, and the emitter electrodes of said transistors being electrically connected to a circuit common point.

8. Apparatus according to claim 7, wherein said burst control means includes third and fourth low voltage transistors, the bases of said third and fourth transistors being connected to said adjustable pulse generator, the collectors of said third and fourth transistors being connected respectively to said first and second NOR gate outputs, and the emitters of said third and fourth transistors being connected to a system common point.

9. Apparatus according to claim 7, wherein said load matching inductive means comprises a load transformer having a primary winding connected at its opposite ends to said first and second high voltage transistors, a primary center tap connected to said second direct current input means, and a secondary winding connected at its opposite ends to said load.

* * * * *